US012579149B2

(12) United States Patent
Andre

(10) Patent No.: US 12,579,149 B2
(45) Date of Patent: *Mar. 17, 2026

(54) AGGREGATING INFORMATION FROM DIFFERENT DATA FEED SERVICES

(71) Applicant: X Development LLC, Mountain View, CA (US)

(72) Inventor: David Andre, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,222

(22) Filed: May 23, 2024

(65) Prior Publication Data

US 2024/0311377 A1     Sep. 19, 2024

Related U.S. Application Data

(63) Continuation of application No. 17/842,132, filed on Jun. 16, 2022, now Pat. No. 12,013,859.

(51) Int. Cl.
*G06F 16/2455* (2019.01)
*G06F 16/248* (2019.01)
(Continued)

(52) U.S. Cl.
CPC ...... *G06F 16/24556* (2019.01); *G06F 16/248* (2019.01); *G06F 40/30* (2020.01); *G06F 40/40* (2020.01)

(58) Field of Classification Search
None
See application file for complete search history.

(56) References Cited

U.S. PATENT DOCUMENTS 10,275,535 B1     4/2019 Trauth
10,978,056 B1 *   4/2021 Challa .................... G06N 5/025
(Continued)

FOREIGN PATENT DOCUMENTS

JP     2020503590 A     1/2020
JP     2022079728 A     5/2022

OTHER PUBLICATIONS

Wang, X. et al., "Dynamic Attention Deep Model for Article Recommendation by Learning Human Editor's Demonstration"; Proceedings of the 2nd ACM International Workshop on Distributed Machine Learning; pp. 2051-2059; dated Aug. 13, 2017.
(Continued)

*Primary Examiner* — Dawaune A Conyers
(74) *Attorney, Agent, or Firm* — Gray Ice Higdon

(57) ABSTRACT

Implementations are described herein for aggregating information responsive to a query from multiple different data feed services using machine learning. In various implementations, NLP may be performed on a natural language input comprising a query for information to generate a data feed-agnostic aggregator embedding (FAAE). A plurality of data feed services may be selected, each having its own data feed service action space that includes actions that are performable to access data via the data feed service. The FAAE may be processed based on domain-specific machine learning models corresponding to the selected data feed services. Each domain-specific machine learning model may translate between a respective data feed service action space and a data feed-agnostic semantic embedding space. Using these models, action(s) may be selected from the data feed service action spaces and performed to aggregate, from the plurality of data feed services, data that is responsive to the query.

20 Claims, 5 Drawing Sheets

(51) Int. Cl.
  *G06F 40/30*      (2020.01)
  *G06F 40/40*      (2020.01)

(56)           References Cited

U.S. PATENT DOCUMENTS

| | | | |
|---|---|---|---|
| 11,137,885 B2 * | 10/2021 | Beechuk | .................. H04L 51/52 |
| 2013/0041893 A1 | 2/2013 | Strike | |
| 2013/0110978 A1 | 5/2013 | Gordon | |
| 2013/0254309 A1 * | 9/2013 | Jackson | .................. H04L 51/52 |
| | | | 709/206 |
| 2016/0203221 A1 | 7/2016 | Rao | |
| 2018/0101614 A1 | 4/2018 | Kuipers | |
| 2021/0192651 A1 | 6/2021 | Groth | |
| 2022/0067077 A1 | 3/2022 | Tupakula | |
| 2023/0409577 A1 | 12/2023 | Andre | |

OTHER PUBLICATIONS

European Patent Office; International Search Report and Written Opinion issued in Application No. PCT/US2023/025470; 15 pages; dated Sep. 7, 2023.
Banos, E., et al., PersoNews: A Personalized News Reader Enhanced by Machine Learning and Semantic Filtering, Department of Informatics, Aristotle University of Thessaloniki, 54124, Thessaloniki, Greece, 8 pages, dated 2006.
Giannikopoulos, et al., Mining Frequent Generalized Patterns for Web Personalization, 5 pages.
Brooks, Teresa Nicole, MyFido: AI Based RSS Feed Aggregator, Pace University Fall 2008-Fall 2009, 121 pages, dated 2008.
Lada, et al., How Machine Learning Powers Facebook's News Feed Ranking Algorithm, Meta, 7 pages, dated Jan. 26, 2021.
Moreau, Elise, 4 RSS Aggregator Tools to Combine Multiple RSS Feeds, Livewire Tech for Humans, 8 pages, dated Jun. 16, 2022.
Japan Patent Office; Patent Allowance issued in Application No. 2024571331, 6 pages, dated Jan. 21, 2026.

* cited by examiner

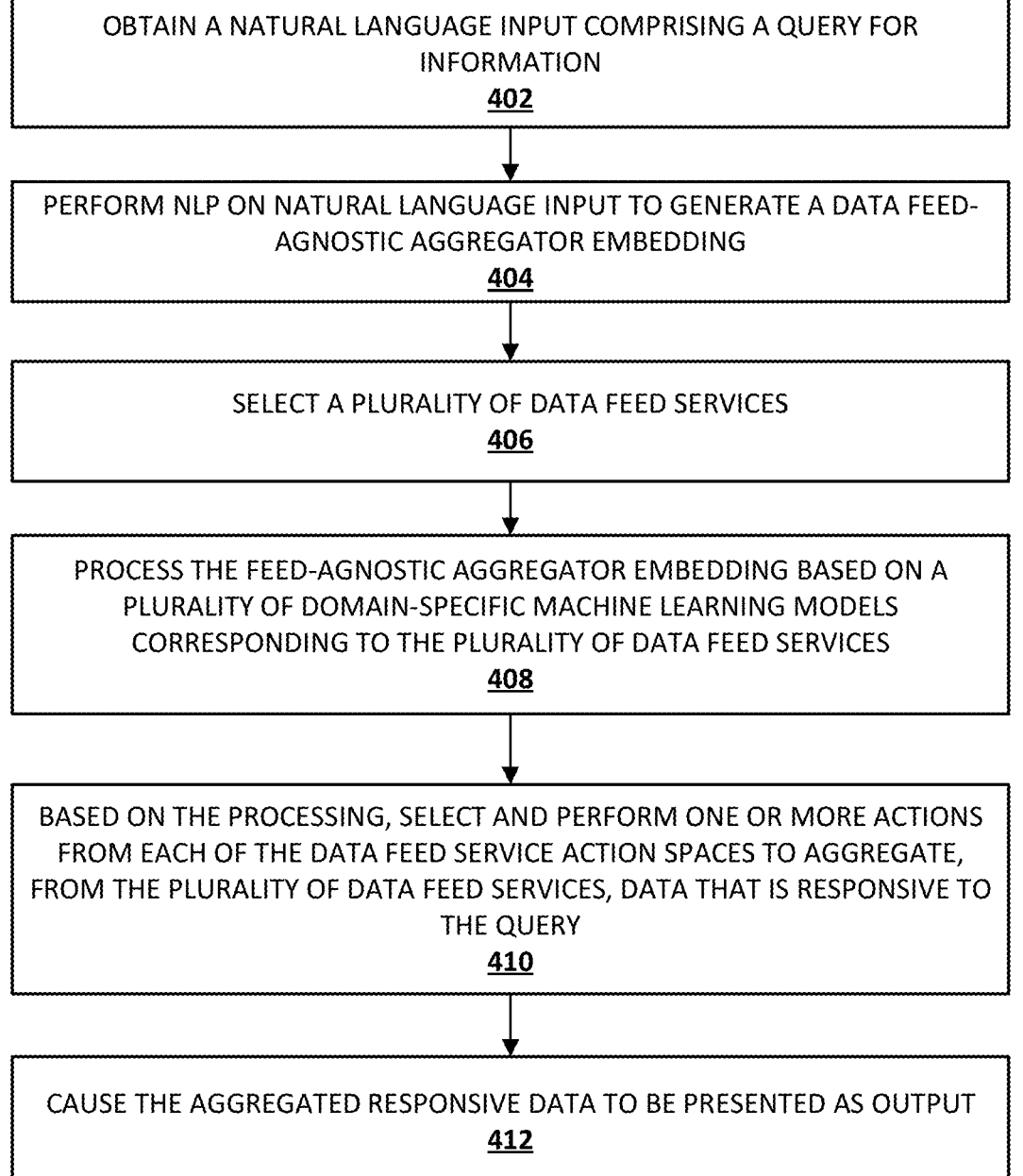

OBTAIN A NATURAL LANGUAGE INPUT COMPRISING A QUERY FOR
INFORMATION
<u>402</u>

PERFORM NLP ON NATURAL LANGUAGE INPUT TO GENERATE A DATA FEED-
AGNOSTIC AGGREGATOR EMBEDDING
<u>404</u>

SELECT A PLURALITY OF DATA FEED SERVICES
<u>406</u>

PROCESS THE FEED-AGNOSTIC AGGREGATOR EMBEDDING BASED ON A
PLURALITY OF DOMAIN-SPECIFIC MACHINE LEARNING MODELS
CORRESPONDING TO THE PLURALITY OF DATA FEED SERVICES
<u>408</u>

BASED ON THE PROCESSING, SELECT AND PERFORM ONE OR MORE ACTIONS
FROM EACH OF THE DATA FEED SERVICE ACTION SPACES TO AGGREGATE,
FROM THE PLURALITY OF DATA FEED SERVICES, DATA THAT IS RESPONSIVE TO
THE QUERY
<u>410</u>

CAUSE THE AGGREGATED RESPONSIVE DATA TO BE PRESENTED AS OUTPUT
<u>412</u>

Fig. 4                    400

AGGREGATING INFORMATION FROM DIFFERENT DATA FEED SERVICES

BACKGROUND

Individuals often seek semantically related information from multiple different sources in a habitual manner. For instance, a particular individual may tend to check the same data feed services, such as news websites and/or social networking data feeds, to obtain different perspectives on a particular topic, such as a developing event, a new movie, a sports event, etc. However, in addition to specific information sought by the individual, the various data feed services may communicate myriad other information that is not relevant to the individual at the moment. Consequently, it can be cumbersome and/or time-consuming for the individual to sift through multiple different data feed services to obtain the specific information they seek. This problem may be amplified when interacting with a voice user interface (VUI) provided by a computing device such as a smart speaker or in-vehicle voice command system. In addition, individual data feed services routinely alter how data is presented and/or made accessible, which can impede the individual's efforts further.

SUMMARY

Implementations are described herein for aggregating information responsive to a query from multiple different data feed services using machine learning. More particularly, but not exclusively, implementations are described herein for leveraging domain-specific machine learning models to query information from disparate data feed services using a data feed-agnostic aggregator embedding. Embodiments described herein give rise to various technical advantages. Rather than navigating multiple different data feed services to obtain information about a topic, an individual can simply issue a free-form natural language query that describes what information the individual seeks and, where applicable, where the individual seeks this information from. Responsive information from multiple different data feed services may then be obtained and presented to the individual together, e.g., as part of an aggregated data feed. Thus, the individual can obtain different perspectives about a topic and/or multiple takes about the topic from another person across multiple different data feed services.

In some implementations, a method may be implemented using one or more processors and may include: obtaining a natural language input comprising a query for information; performing natural language processing (NLP) on the natural language input to generate a data feed-agnostic aggregator embedding; selecting a plurality of data feed services, wherein each data feed service of the selected plurality of data feed services includes its own data feed service action space, wherein each data feed service action space comprises actions that are performable to access data communicated via the respective data feed service; processing the feed-agnostic aggregator embedding based on a plurality of domain-specific machine learning models corresponding to the plurality of data feed services, wherein each domain-specific machine learning model is trained to translate between a respective data feed service action space and a data feed-agnostic semantic embedding space that includes the data feed-agnostic aggregator embedding; based on the processing, selecting and performing one or more actions from each of the data feed service action spaces to aggregate, from the plurality of data feed services, data that is responsive to the query; and causing the aggregated responsive data to be presented as output.

In various implementations, the plurality of data feed services may be selected based on an entity identifier contained in the query for information. In various implementations, the query for information may include a request for social media posts from a particular individual, and the selected plurality of data feed services may include two or more social media services that are selected based on membership of the particular individual with the two or more social media services. In various implementations, for a given social media service of the two or more social media services, the one or more actions selected from the data feed service action space of the given social media service may include accessing one or more posts by the particular individual from the particular individual's posting history. In various implementations, for a given social media service of the two or more social media services, the one or more actions selected from the data feed service action space of the given social media service may include filtering one or more posts by the particular individual from a general data feed on the given social media service provided to a user who issued the natural language input.

In various implementations, the plurality of data feed services may be selected based on a lookup table controlled by a user who issued the natural language input. In various implementations, the lookup table may include a contact list of the user. In various implementations, the plurality of data feed services may be selected based on a user who issued the natural language input having previously provided permission to an aggregator agent to access the plurality of data feed services. In various implementations, at least one of the data feed services may include a virtual space that forms part of a larger metaverse comprising multiple virtual spaces.

In various implementations, the aggregated responsive data may be presented to a user who issued the natural language input as part of a metaverse graphical user interface. In various implementations, the plurality of data feed services may be selected based on a browsing history of a user who issued the natural language input.

In addition, some implementations include one or more processors of one or more computing devices, where the one or more processors are operable to execute instructions stored in associated memory, and where the instructions are configured to cause performance of any of the aforementioned methods. Some implementations include at least one non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 is a flowchart illustrating an example method of practicing selected aspects of the present disclosure, according to implementations disclosed herein.

DETAILED DESCRIPTION

Figure 1:
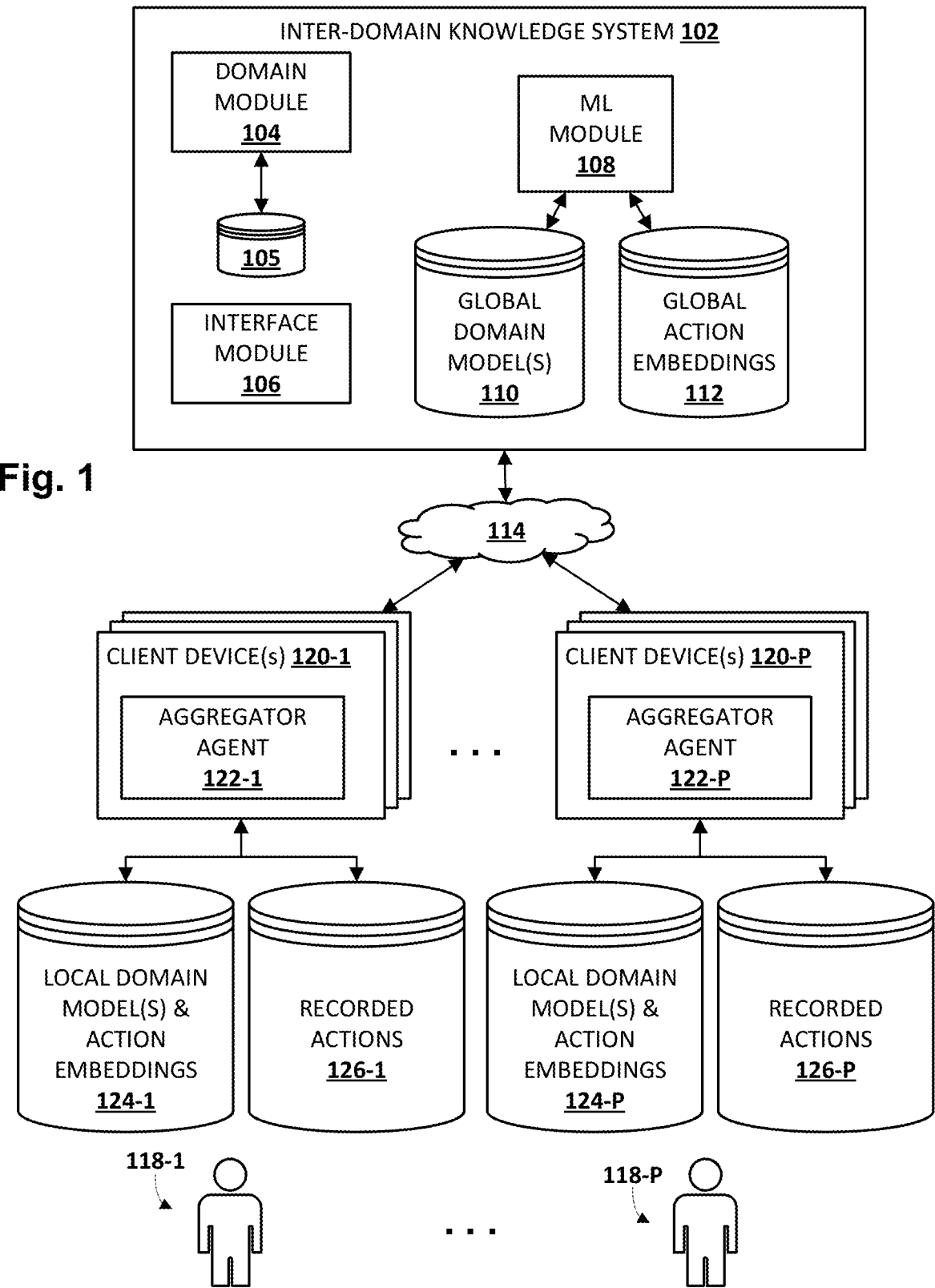
FIG. 1 is a schematic diagram of an example environment in which implementations disclosed herein may be implemented.

Implementations are described herein for aggregating information responsive to a query from multiple different data feed services using machine learning. More particularly, but not exclusively, implementations are described herein for leveraging domain-specific machine learning models to query information from disparate data feed services using a data feed-agnostic aggregator embedding. Embodiments described herein give rise to various technical advantages. Rather than navigating multiple different data feed services to obtain information about a topic, an individual can simply issue a free-form natural language query that describes what information the individual seeks and, where applicable, where the individual seeks this information from. Responsive information from multiple different data feed services may then be obtained and presented to the individual together, e.g., as part of an aggregated data feed. Thus, the individual is able to obtain different perspectives about a topic and/or multiple takes about the topic from another person across multiple different data feed services.

As used herein, a "data feed service" may be any computer-implemented service, such as a web service, which is usable by individuals to promulgate, broadcast, push, and/or multicast content to others. Data feed services are typically accessible by multiple individuals and are generally updated frequently, or at least periodically, with new content, which is often presented in reverse chronological order. One common example of a data feed service is a social networking service on which individual users are able to publish information (e.g., facts, opinions, pictures, statuses) to their "friends" or "followers," or to anyone who accesses the social networking service. Another example of a data feed service is a news website (or more generally, a news service that may publish to both a website and a proprietary application) that continuously publishes news stories, opinions, columns, etc.

These examples of data feed services are not meant to be limiting. Other examples of data feed services include, but are not limited to, weblogs (which are more commonly referred to as "blogs"), web feeds (e.g., really simply syndication, or "RSS," feeds), review aggregation websites, social news websites that feature user-posted content, and so forth. And data feed services are not limited to services that contribute to websites. For example, a data feed service can take the form of a virtual space (e.g., a massively multiplayer online role-playing game ("MMORPG") or portion thereof, a virtual coffee shop or forum, etc.) that forms part of a larger metaverse that includes multiple virtual spaces.

To obtain information responsive to a single natural language query from multiple data feed services at once, natural language processing (NLP) may be performed on the natural language query provided to generate a semantic representation that is referred to herein as a "data feed-agnostic aggregator embedding." The data feed-agnostic aggregator embedding may represent, in the abstract, semantics contained in the natural language query. In some instances, the data feed-agnostic aggregator embedding may be a dense numeric representation, such as a vector of real numbers, which functions as an embedding in a continuous vector space.

In order to leverage the data feed-agnostic aggregator embedding to obtain information from multiple sources at once, a plurality of data feed services that potentially contain information responsive to the individual's query may be selected. Data feed services may be selected on a query-by-query basis and/or across multiple different queries. The potentially responsive data feed services may be selected in various ways based on a variety of signals.

In some implementations, data feed services may be selected based on a lookup table associated with the individual who issued the query. As one example, the individual may have a contact list (e.g., phone book, friends on social media, etc.) that specifies which data feed services are used by the individual's contacts, and hence, which data feed services are selected. As another example, the individual may provide express permission to what will be referred to herein as an "aggregator agent" to obtain responsive information from an enumerated or curated list of data feed services. As yet another example, the individual's browsing history may be consulted to determine, with or without input from the individual, which data feed services the individual tends to consult, in general and/or in particular contexts. For example, if the individual issues a sports-related query, sports-related data feed services visited by the individual historically may be selected. In some implementations, data feed services may be selected based on an entity (person, place, or thing) identified in the query. For example, the individual may request information about a developing event that was communicated (e.g., published, posted, composed) by a particular media pundit. Data feeds services used by that particular media pundit may be selected.

Each data feed service may include its own data feed service action space that includes actions that are performable to access data communicated via the data feed service. Actions of such an action space may include, for instance, actions performable using input devices such as keyboards and pointer devices to navigate a graphical user interface (GUI) provided by the data feed service. For example, if the GUI takes the form of an interactive webpage, then the action space may include actions that are performable using graphical inputs such as fields, pull-down menus, buttons, etc., that are presented as part of the interactive webpage. Additionally or alternatively, the actions may include commands, queries, and/or parameters that can be used to navigate a GUI or VUI provided by the data feed service to obtain specific information. For example, a particular data feed service's interface (GUI or VUI) may include a search field that facilities submission of natural language queries to quickly obtain responsive content, and/or filter fields to narrow the search results.

Domain-specific machine learning models configured with selected aspects of the present disclosure may be trained to translate between these actions spaces and a data feed-agnostic semantic embedding space that includes the aforementioned data feed-agnostic aggregator embeddings. These domain-specific machine learning models (or simply "domain models" elsewhere herein) may take various forms, such as various types of neural networks, transformers, RNNs, graph-based neural networks, etc. In various implementations, a domain-specific machine learning model may be used to process a data feed-agnostic aggregator embedding to generate one or more probability distributions over actions of a data feed service's action space. Based on these probability distribution(s), actions may be selected and performed to obtain, from the data feed service, content that is responsive to a query represented semantically by the data feed-agnostic aggregator embedding. The responsive content from the data feed service may be aggregated with responsive content obtained from other data feed services in a similar fashion. The aggregated responsive content may then be presented to the individual that issued the original natural language input.

As used herein, a "domain" may refer to a targeted subject area in which a computing component is intended to operate, e.g., a sphere of knowledge, influence, and/or activity around which the computing component's logic revolves. In some implementations, domains in which queries are to be submitted may be identified by heuristically matching keywords in the user-provided input with domain keywords. In other implementations, the user-provided input may be processed, e.g., using NLP techniques such as word2vec, a Bidirectional Encoder Representations from Transformers (BERT) transformer, various types of recurrent neural networks ("RNNs," e.g., long short-term memory or "LSTM," gated recurrent unit or "GRU"), etc., to generate a semantic embedding that represents the natural language input. In some implementations, this natural language input semantic embedding—which as noted previously may be referred to as a "data feed-agnostic aggregator embedding"—may be used to identify one or more domains, e.g., based on distance(s) in embedding space (or vector space) between the data feed-agnostic aggregator embedding and other embeddings associated with various domains. These distances in embedding space may be calculated using techniques such as Euclidean distance, dot product, cosine similarity, etc.

In various implementations, one or more domain models may have been generated previously for each domain. For instance, one or more machine learning models—such as an RNN (e.g., LSTM, GRU), BERT transformer, various types of neural networks, a reinforcement learning policy, etc. —may be trained based on a corpus of documentation associated with the domain. As a result of this training, one or more of the domain model(s) may be at least bootstrapped so that it is usable to process what will be referred to herein as a "domain-agnostic aggregator embedding" to generate one or more probability distributions over an action space associated with a target domain. Based on these probability distribution(s), a plurality of actions may be selected and performed to carry out a user-submitted query in the target domain.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as an inter-domain knowledge system 102, may be implemented using one or more server computing devices that form what is sometimes referred to as a "cloud infrastructure," although this is not required. In other implementations, aspects of inter-domain knowledge system 102 may be implemented on client devices 120, e.g., for purposes of preserving privacy, reducing latency, etc.

Inter-domain knowledge system 102 may include a number of different components configured with selected aspects of the present disclosure, such as a domain module 104, an interface module 106, and a machine learning ("ML" in FIG. 1) module 108, to name a few. Inter-domain knowledge system 102 may also include any number of databases for storing machine learning model weights and/or other data that is used to carry out selected aspects of the present disclosure. In FIG. 1, for instance, inter-domain knowledge system 102 includes a database 110 that stores global domain models and another database 112 that stores data indicative of global action embeddings.

Inter-domain knowledge system 102 may be operably coupled via one or more computer networks (114) with any number of client computing devices that are operated by any number of users. In FIG. 1, for example, a first user 118-1 operates one or more client devices 120-1, e.g., a coordinated ecosystem of client devices controlled by user 118-1 and/or associated with an online profile of user 118-1. A pth user 118-P operates one or more client device(s) 120-P. As used herein, client device(s) 120 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor and/or touchscreen display), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided.

Domain module 104 may be configured to determine a variety of different information about domains (e.g., data feed services) that are relevant to a given user 118 at a given point in time, such as a data feed service with which the user 118 currently engages, data feed service(s) which the user would like to query for information, etc. To this end, domain module 104 may collect contextual information about, for instance, foregrounded and/or backgrounded applications executing on client device(s) 120 operated by the user 118, webpages current/recently visited by the user 118, domain(s) in which the user 118 has access and/or accesses frequently, and so forth.

With this collected contextual information, in some implementations, domain module 104 may be configured to identify one or more domains (e.g., data feed services) that are relevant to a natural language input provided by a user. For instance, a user-composed query seeking responsive information from multiple different data feed services may be processed by domain module 104 to identify the data feed service(s) which the user 118 intends to query.

In some implementations, domain module 104 may also be configured to retrieve domain knowledge from a variety of different sources associated with an identified domain. In some such implementations, this retrieved domain knowledge (and/or an embedding generated therefrom) may be provided to downstream component(s), e.g., in addition to the natural language input or contextual information mentioned previously. This additional domain knowledge may allow downstream component(s), particularly machine learning models, to be used to make predictions (e.g., aggregating responsive information from multiple different domains) that is more likely to be satisfactory.

In some implementations, domain module 104 may apply the collected contextual information (e.g., a current state) across one or more "domain selection" machine learning model(s) 105 that are distinct from the domain models described herein. These domain selection machine learning model(s) 105 may take various forms, such as various types of neural networks, support vector machines, random forests, BERT transformers, etc. In various implementations, domain selection machine learning model(s) 105 may be trained to select applicable domains based on attributes (or "contextual signals") of a current context or state of user 118 and/or client device 120. For example, if user 118 is operating a particular website's input form to procure a good or service, that website's uniform resource locator (URL), or attributes of the underlying webpage(s), such as keywords, tags, document object model (DOM) element(s), etc. may be applied as inputs across the model, either in their native forms or as reduced dimensionality embeddings. Other contextual signals that may be considered include, but are not limited to, the user's IP address (e.g., work versus home versus mobile IP address), time-of-day, social media status, calendar, email/text messaging contents, and so forth.

Interface module 106 may provide one or more GUIs or VUIs that can be operated by various individuals, such as users 118-1 to 118-P, to perform various actions made available by semantic task automation system. In various implementations, user 118 may operate a GUI (e.g., a standalone application or a webpage) provided by interface module 106 to opt in or out of making use of various techniques described herein. For example, users 118-1 to 118-P may be required to provide explicit permission on for each data feed service (more generally, domain) they wish to query before their search requests are used to retrieve responsive information from those data feed services.

ML module 108 may have access to data indicative of various global domain/machine learning models/policies in database 110. These trained global domain/machine learning models/policies may take various forms, including but not limited to a graph-based network such as a graph neural network (GNN), graph attention neural network (GANN), or graph convolutional neural network (GCN), a sequence-to-sequence model such as an encoder-decoder, various flavors of a recurrent neural network (e.g., LSTM, GRU, etc.), a BERT transformer network, a reinforcement learning policy, and any other type of machine learning model that may be applied to facilitate selected aspects of the present disclosure. ML module 108 may process various data based on these machine learning models at the request or command of other components, such as domain module 104 and/or interface module 106.

Each client device 120 may operate at least a portion of what will be referred to herein as an "aggregator agent" 122. Aggregator agent 122 may be a computer application that is operable by a user 118 to perform selected aspects of the present disclosure to facilitate inter-domain data aggregation as described herein. For example, aggregator agent 122 may receive a request and/or permission from the user 118 to aggregate query-responsive data from multiple different domains. In some implementations, aggregator agent 122 may be operable to grant access to domains controlled by a user to others, e.g., other aggregator agents 122. For example, user 118-1 may interact with aggregator agent 122-1 to allow particular other individuals to access a portion of a domain controlled by user 118-1, such as the user's own social networking profile feed. Without such explicit permission, other aggregator agents 122 may not be able to retrieve responsive information from the user's social networking profile feed.

In some implementations, aggregator agent 122 may take the form of what is often referred to as a "virtual assistant" or "automated assistant" that is configured to engage in human-to-computer natural language dialog with user 118. For example, aggregator agent 122 may be configured to semantically process natural language input(s) provided by user 118 to identify one or more intent(s). Based on these intent(s), aggregator agent 122 may perform a variety of tasks, such as operating smart appliances, retrieving information, performing tasks, and so forth. In some implementations, a dialog between user 118 and aggregator agent 122 (or a separate automated assistant that is accessible to/by aggregator agent 122) may constitute a sequence of actions that, as described herein, can be captured, abstracted into a domain-agnostic embedding, and then extended into other domains.

In FIG. 1, each of client device(s) 120-1 may include an aggregator agent 122-1 that serves first user 118-1. First user 118-1 and their aggregator agent 122-1 may have access to and/or may be associated with a "profile" that includes various data pertinent to performing selected aspects of the present disclosure on behalf of first user 118-1. For example, aggregator agent 122 may have access to one or more edge databases or data stores associated with first user 118-1, including an edge database 124-1 that stores local domain model(s), and/or another edge database 126-1 that stores recorded actions. Other users 118 may have similar arrangements. Any of data stored in edge databases 124-1 and 126-1 may be stored partially or wholly on client devices 120-1, e.g., to preserve the privacy of first user 118-1. For example, recorded actions 126-1, which may include sensitive and/or personal information of first user 118-1 user such as payment information, address, phone numbers, etc., may be stored in its raw form locally on a client device 120-1.

The local domain model(s) stored in edge database 124-1 may include, for instance, local versions of global model(s) stored in global domain model(s) database 110. In some implementations, the global models may be propagated to the edge for purposes of bootstrapping aggregator agents 122 to extend tasks into new domains associated with those propagated models; thereafter, the local models at the edge may or may not be trained locally based on activity and/or feedback of the user 118. In some such implementations, the local models (in edge databases 124, alternatively referred to as "local gradients") may be periodically used to train global models (in database 110), e.g., as part of a federated learning framework. As global models are trained based on local models, the global models may in some cases be propagated back out to other edge databases (124), thereby keeping the local models up-to-date.

However, it is not a requirement in all implementations that federated learning be employed. In some implementations, aggregator agents 122 may provide scrubbed data to inter-domain knowledge system 102, and ML module 108 may apply models to the scrubbed data remotely. In some implementations, "scrubbed" data may be data from which sensitive and/or personal information has been removed and/or obfuscated. In some implementations, personal information may be scrubbed, e.g., at the edge by aggregator agents 122, based on various rules. In other implementations, scrubbed data provided by aggregator agents 122 to inter-domain knowledge system 102 may be in the form of reduced dimensionality embeddings that are generated from raw data at client devices 120.

As noted previously, edge database 126-1 may store actions recorded by aggregator agent 122-1. Aggregator agent 122-1 may record actions in a variety of different ways, depending on the level of access aggregator agent 122-1 has to computer applications executing on client device 120-1 and permissions granted by the user 118. For example, most smart phones include operating system (OS) interfaces for providing or revoking permissions (e.g., location, access to camera, etc.) to various computer applications. In various implementations, such an OS interface may be operable to provide/revoke access to aggregator agent 122, and/or to select a particular level of access aggregator agent 122 will have to particular computer applications and/or domains to which those applications provide access.

Aggregator agent 122-1 may have various levels of access to the workings of computer applications, depending on permissions granted by the user 118, as well as cooperation from software developers that provide the computer applications. Some computer applications may, e.g., with the permission of a user 118, provide aggregator agent 122 with "under-the-hood" access to the applications' APIs, or to scripts writing using programming languages (e.g., macros) embedding in the computer applications. Other computer applications may not provide as much access. In such cases, aggregator agent 122 may record actions in other ways, such as by capturing screen shots, performing optical character recognition (OCR) on those screenshots to identify menu items, and/or monitoring user inputs (e.g., interrupts caught by the OS) to determine which graphical elements were operated by the user 118 in which order. In some implementations, aggregator agent 122 may intercept actions performed using a computer application from data exchanged between the computer application and an underlying OS (e.g., via system calls). In some implementations, aggregator agent 122 may intercept and/or have access to data exchanged between or used by window managers and/or window systems.

Figure 2:
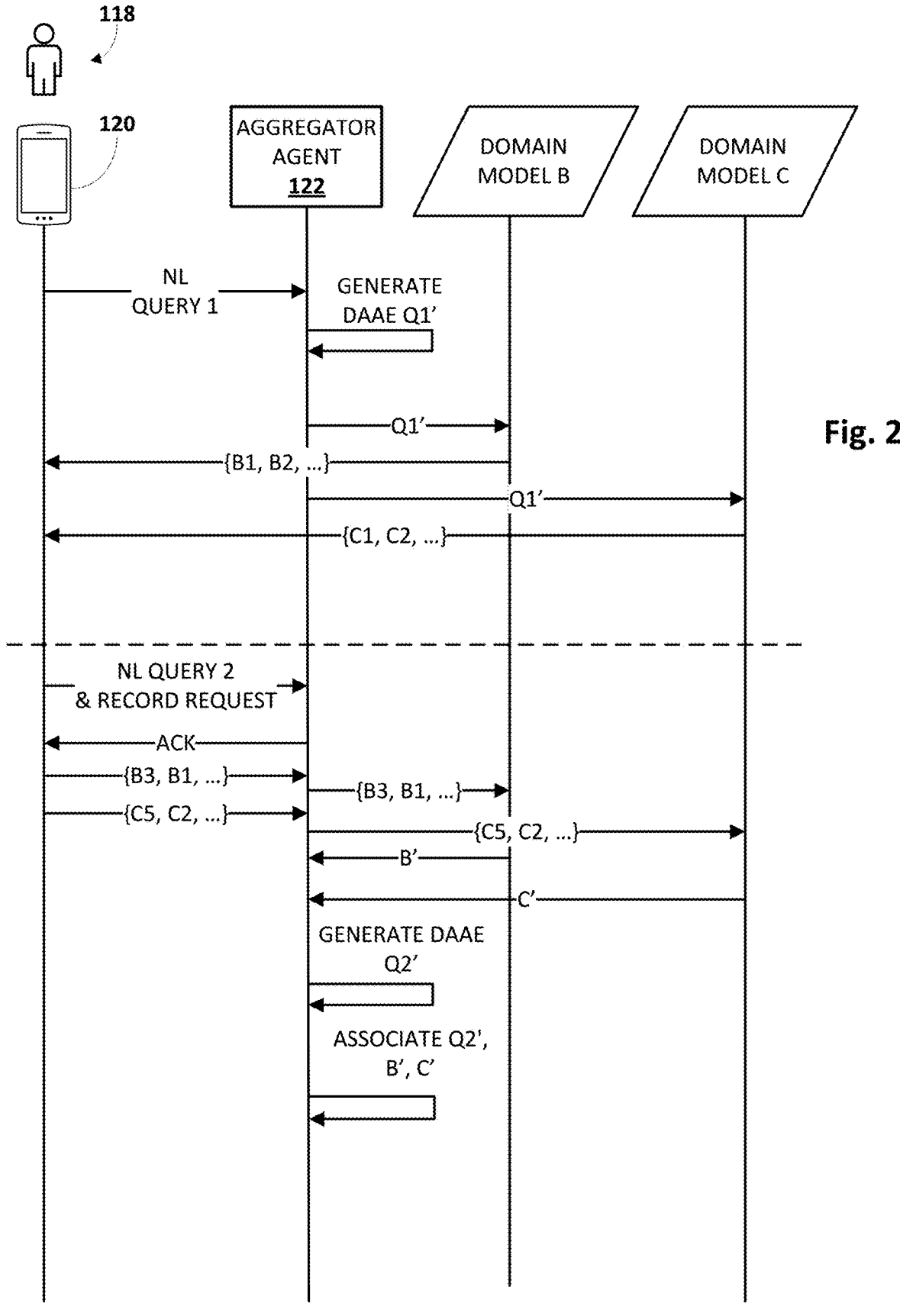
FIG. 2 schematically illustrates an example of how data may be exchanged and/or processed to perform selected aspects of the present disclosure, in accordance with various implementations.

FIG. 2 schematically depicts an example of how data may be processed by and/or using various components across domains. Starting at top left, a user 118 operates a client device 120 to provide typed or spoken natural language query NL QUERY 1. In the latter case, the spoken utterance may first be processed using a speech-to-text (STT) engine (not depicted) to generate speech recognition output. Whichever the case, NL QUERY 1 may be provided to aggregator agent 122.

Aggregator agent 122 may process, or cause ML module 108 to process, data indicative of NL QUERY 1 to generate a data feed-agnostic aggregator embedding (DAAE) Q1'. In some implementations, aggregator agent 122 and/or ML module 108 may use a machine learning model such as a transformer network or a recurrent neural network (e.g., LSTM, GRU) to generate DAAE Q1'. DAAE Q1' may then be processed, e.g., by aggregator agent 122 or ML module 108, using a domain model B associated with a first data feed service and a domain model C associated with a second data feed service. The processing of DAAE Q1' using domain model B generates probability distribution(s), which in turn may be used to select a plurality of actions {B1, B2, . . . } from a first data feed service action space associated with the first data feed service. Likewise, the processing of DAAE Q1' using domain model C results in a plurality of actions {C1, C2, . . . } being selected from a second data feed service action space associated with the second data feed service.

These selected actions {B1, B2, . . . } and {C1, C2, . . . } may be performed by various components in order to retrieve, from the respective domains of the first and second data feed services, information that is responsive to the original query NL QUERY 1. In FIG. 2, for instance, the selected actions {B1, B2, . . . } and {C1, C2, . . . } are provided by aggregator agent 122 to client device 120. Client device 120 may then perform the selected actions, e.g., by way of corresponding applications installed and operating on client device 120.

For example, if the first data feed service associated with domain model B is a social network service, then a compatible social networking application (e.g., client) operating on client device 120 may automatically perform actions {B1, B2, . . . } to retrieve responsive data from the social network service. Similarly, if the second data feed service associated with domain model C is a blog curated by a second individual, then a compatible client application (e.g., web browser) operating on client device 120 may automatically perform actions {C1, C2, . . . } to retrieve responsive data from the blog. User 118 may or may not be able to see these actions performed automatically in a GUI rendered by the client application.

The quality and/or responsiveness of aggregated information that is returned in response to a user's initial query may turn at least in part on the specificity of the query. A vague query may yield actions that will not truly carry out the user's intent, e.g., because the resulting aggregated information may have limited value, and/or because actions selected and performed vis-à-vis different data feed services may be incongruent, which may lead to responsive information retrieved from the different data feed services also being incongruent. In FIG. 2, for instance, if NL QUERY 1 is vague and/or ambiguous, the selected actions {B1, B2, . . . } and {C1, C2, . . . } may obtain substantially different results from each data feed service. A query that is more detailed and clearly sets forth the user's intent, on the other hand, is likely to yield better results. However, if the onus on users to be specific and clear is too high, users may prefer to aggregate information from multiple different data feed services manually.

Accordingly, in some implementations, users may be able to record actions they perform vis-à-vis a particular data feed service to obtain responsive information and associate those actions with a custom natural language statement they provide. In other words, the recorded actions, rather than the statement, contain the contextual information that is usable to perform similar actions with other data feed services. In this way it is possible to associate natural language statements that are otherwise lacking in detail (e.g., "long-tail" natural language statements) with concrete actions that can be used to aggregate information from multiple different data feed services.

An example of this is depicted in FIG. 2. Below the dashed line, user 118 operates client device 120 to request and/or permit recording of actions performed by user 118 using client device 120 in association with another natural language query NL QUERY 2. In various implementations, aggregator agent 122 is unable to record actions without receiving this permission. In some implementations, this permission may be granted on an individual data feed service basis and/or on an application-by-application basis, much in the way applications are granted permission to access GPS coordinates, local files, use of an onboard camera, etc. In other implementations, this permission may be granted only until user 118 says otherwise, e.g., by pressing a "stop recording" button akin to recording a macro, or by providing a speech input such as "stop recording" or "that's it."

Once the request/permission is received, in some implementations, aggregator agent 122 may acknowledge (ACK) the request/permission. Next, sequences of actions {B3, B1, . . . } and {C5, C2, . . . } performed by user 118 using client device 120 may be captured and stored in edge database 126. These actions {B3, B1, . . . } and {C5, C2, . . . } may take various forms or combinations of forms, such as command line inputs, as well as interactions with one or more VUIs or GUIs using various types of inputs, such as pointer device (e.g., mouse) inputs, keyboard inputs, speech inputs, gaze inputs, speech inputs, and any other type of input capable of interacting with a graphical element of a GUI or with a VUI.

In various implementations, the domain(s) in which these actions are performed may be identified, e.g., by domain module 104, using any combination of NL QUERY 2, computer application(s) operated by user 118 to perform these actions, a remote data feed service (e.g., email, text messaging, social media) accessed by a user, a project the user is working on, and so forth. In some implementations, the domain(s) may be identified at least in part by an area of a simulated digital world, sometimes referred to as a "metaverse," in which in user 118 operates or visits virtually. For example, user 118 may record actions {B3, B1, . . . } that retrieve scores of particular other users (e.g., their online gaming friends), brief video replays of those other users' performances, etc. from a first metaverse game associated with domain model B. Similarly, user 118 may record actions {C5, C2, . . . } that cause retrieve scores of the same other users, brief video replays of those other users' performances, etc. from a second metaverse game associated with domain model C.

Aggregator agent 122 may process actions {B3, B1, . . . } using domain model B (or another domain model associated with the same domain) to generate an action embedding B'. Likewise, aggregator agent 122 may process actions {C5, C2, . . . } using domain model C (or another domain model associated with the same domain) to generate an action embedding C'. And as before, aggregator agent 122 (or another component, such as ML module 108) may process NL QUERY 2 to generate another data feed-agnostic aggregator embedding Q2'.

Then, aggregator agent 122 (or another component, such as ML module 108) may associate the embeddings Q2', B', and C' in and/or across one or more embedding spaces using a variety of different techniques, such as triplet loss, etc. In some implementations, embeddings Q2', B', and C' may be combined into a single data feed-agnostic aggregator embedding, e.g., via concatenation, averaging, etc. However the embeddings Q2', B', and C' are associated with each other or combined into a unified embedding, user 118 or other users may then be able to issue semantically similar natural language queries in the future. In some instances, those queries may be mapped to the action embeddings B' and/or C', which in turn can be leveraged to aggregate data from multiple different data feed services, including data feed services other than those associated with domain models B and C. Notably, NL QUERY 2 need not be laden with details, nor do other semantically similar queries issued subsequently need to be detail-laden.

In various implementations, simulation may be performed, e.g., by aggregator agent 122 and/or components of inter-domain knowledge system 102, to further train domain models. More particularly, various permutations of actions may be simulated to determine synthetic outcomes. These synthetic outcomes may be compared, for instance, to natural language inputs associated with the original sets of actions from which the simulated permutations are selected.

The successes or failures of these synthetic outcomes may be used as positive and/or negative training examples for domain models. In this way, it is possible to train domain models based on far more than the user-recorded actions and accompanying natural language inputs.

Figure 3:
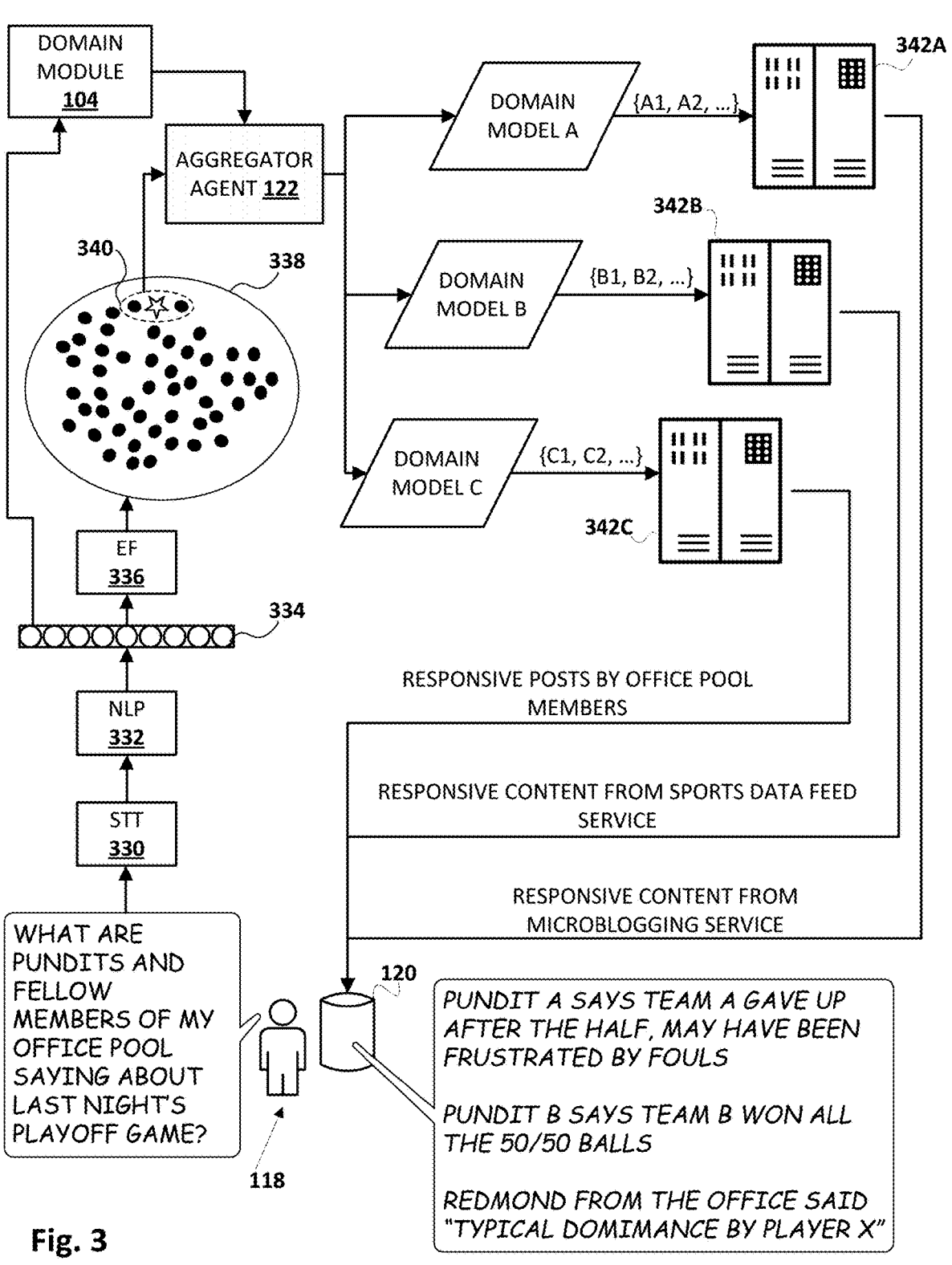
FIG. 3 schematically illustrates another example of how data may be processed to query multiple domains using a data feed-agnostic aggregator embedding, in accordance with various implementations.

FIG. 3 schematically depicts, from a different perspective than FIG. 2, another example of how techniques described herein may be used to aggregate information responsive to a user-issued query from multiple different data feed services. Starting at bottom left, a user 118 operates a client device 120 (in this example, a standalone interactive speaker) and speaks a natural language command, "What are pundits and fellow members of my office pool saying about last night's playoff game?"

A STT module 330 may perform STT processing to generate speech recognition output. The speech recognition output may be processed by a natural language processing (NLP) module 332, e.g., using machine learning model(s) such as transformer(s), RNN(s), etc., to generate data feed-agnostic aggregator embedding 334. An embedding finder ("EF" in FIG. 3) module 336 may map or project data feed-agnostic aggregator embedding 334 to an existing data feed-agnostic aggregator embedding (white star) in an embedding space 338. In various implementations, STT module 330, NLP module 332, and/or EF module 336 may be implemented as part of aggregator agent 122, as part of inter-domain knowledge system 102, or any combination thereof.

Embedding space 338 may be a continuous space that includes a plurality of data feed-agnostic aggregator embeddings, each represented in FIG. 3 by a block dot. These data feed-agnostic aggregator embeddings may be abstractions of prior natural language queries and, where applicable, domain-specific actions recorded in various domains' action spaces. Embedding space 338 is depicted as two-dimensional for purposes of illustration and understanding only. It should be understood that embedding space 338 would, in fact, have as many dimensions as the individual embeddings, which could be hundreds, or even thousands, of dimensions.

The white star represents the coordinate in embedding space 338 associated with data feed-agnostic aggregator embedding 334. As can be seen in FIG. 3, this white star in fact lies between two data feed-agnostic aggregator embeddings enclosed by ellipse 340. In some implementations, multiple embeddings may match a single natural language input, e.g., because those multiple embeddings are semantically similar to each other. In some implementations, multiple matching data feed-agnostic aggregator embeddings, such as the two within ellipse 340, may be combined into a unified representation, e.g., via concatenation or averaging, and the unified data feed-agnostic aggregator embedding may be processed by downstream components.

Aggregator agent 122 may then process, or have processed, the data feed-agnostic aggregator embedding(s) using a plurality of domain models A-C, each associated with a different domain from which user 118 wishes to aggregate information. Domain A may represent, for instance, a social media data feed service provided by one or more social media servers 342A. Domain B may represent, for instance, a sports data feed service (e.g., a sports-centric website) served by one or more servers 342B. Domain C may represent, for instance, a microblogging data feed service served by one or more servers 342C. One or more of servers 342A-C may or may not be part of a cloud infrastructure, and therefore may not necessarily be tied to particular server instances.

Processing the selected action embedding(s) based on domain model A may generate probability distribution(s) over actions in the applicable action space. Based on those probability distribution(s), actions {A1, A2, . . . } may be selected, similar to described previously. Likewise, processing the selected action embedding(s) based on domains model B and C may result in, respectively, actions {B1, B2, . . . } and {C1, C2, . . . } being selected. These actions may be performed in their respective domains, e.g., by servers 342A-C and/or by compatible client application(s) executing on client device 120.

As a result, social media servers 342A may retrieve and return, e.g., to client device 120 (e.g., by way of aggregator agent 122), the most recent social media posts from anyone included on a list, curated by user 118, of media pundits and/or fellow office pool members. In some implementations, the user's own default social media feed, where posts from the user's friends and/or people the user follows may appear in reverse chronological order, may be searched for responsive content posted by the pundits and/or the user's office pool mates. Alternatively, the personal feeds of each of the pundits and/or user's office pool mates may be searched for responsive content. In various implementations, the way the social media data feed (or any other data feed) is searched may depend on permissions granted by the entity who provides the data feed. For example, the social media data feed service may provide an API that can be tapped into to obtain responsive information. Or, if the social media data feed service wishes, it can prevent aggregator agents 122 from obtaining responsive content, e.g., via terms and conditions of use and/or using technological means, such as completely automated public Turing tests to tell computers and humans apart (CAPTCHA).

Sports data feed server(s) 342B may retrieve and return, e.g., to client device 120 (e.g., by way of aggregator agent 122), the most recent content contributed by any of the pundits. Although it might be the case that no one on the office pool publishes content to such a sports website, those office pool members may be able to post to comment sections of the sports website, e.g., at the bottom of the articles. In some such instances, those office pool members' comments may be searched for responsive data using techniques described herein. Microblogging server(s) 342C may retrieve and return, e.g., to client device 120 (e.g., by way of aggregator agent 122), the most recent microblogging posts by any of the identified pundits or office pool members.

In some implementations, all or some of these returned messages may be collated and/or aggregated and presented to user 118, audibly or visually. In other implementations, these returned messages may be compared to identify the most recent, and that message alone may be presented to user 118. For example, where the client device 120 is a standalone interactive speaker without display capabilities, as is the case in FIG. 3 (or as might be the case in a vehicle, for instance), it may be advantageous to minimize the amount of output to avoid inundating or distracting user 118, in which case the most recent content of any of the domains may be read aloud. Additionally or alternatively, the returned content may be processed, e.g., by ML module 108 using a sequence-to-sequence machine learning model that is trained to paraphrase and/or summarize longer textual content, so that the content ultimately presented to user 118 is shorter and/or more succinct.

FIG. 4 is a flowchart illustrating an example method 400 for practicing selected aspects of the present disclosure, according to implementations disclosed herein. For convenience, the operations of the flow chart are described with reference to a system that performs the operations. This system may include various components of various computer systems, such as one or more components of inter-domain knowledge system 102. Moreover, while operations of method 400 are shown in a particular order, this is not meant to be limiting. One or more operations may be reordered, omitted or added.

At block 402, the system may obtain a natural language input comprising a query for information. A user (118) may type such a natural language and/or may provide a spoken utterance, which can be processed, e.g., by STT module 330, to generate speech recognition output. In some cases, the natural language input may identify one or more entities that are relevant to the search. These entities may include, for instance, individuals who post content to data feed services. These individuals may be friends, pundits, academics, journalists, politicians, celebrities, or other public or private figures. Additionally or alternatively, the natural language input may identify one or more data feed services that are to be searched. For example, an individual may request content from all of the individual's subscribed social media feeds.

Whatever the form of the natural language input, at block 404, natural language processing (NLP) may be performed, e.g., by ML module 108, on the natural language input to generate a data feed-agnostic aggregator embedding. This NLP may be performed, for instance, using a machine learning model such as an RNN or transformer. As described previously, when the natural language input contains sufficient detail, the data feed-agnostic aggregator embedding may itself be sufficient to be processed using domain models to generate probability distributions. Alternatively, the data feed-agnostic aggregator embedding can be relatively vague, so long as it is semantically similar to previous data feed-agnostic aggregator embeddings, generated from "long tail" or otherwise low-detail natural language queries, which are mapped to (or combined with) action embeddings generated by the same user or different users.

At block 406, the system, e.g., by way of aggregator agent 122 or domain module 104, may select a plurality of data feed services from which content is to be aggregated. Data feed services may be selected based on various signals or factors, such as content of the natural language input, synonyms of tokens in the natural language input, a context of the user (e.g., at work, driving a vehicle, time-of-day), permissions granted by the user (e.g., the user may have previously opted aggregator agent 122 into various selected data feed services), a contact list of the user (which may indicate on which data feed services the user's friends push content), and so forth. In various implementations, each selected data feed service may include its own data feed service action space of actions that are performable to access data communicated via the respective data feed service. These actions may include, for instance, actions that are performable at a client application, e.g., using voice, keyboards, pointing devices, etc., or actions that are performable server-side, e.g., via API calls.

At block 408, the system, e.g., by way of ML module 108 or aggregator agent 122, may process the feed-agnostic aggregator embedding based on a plurality of domain-specific machine learning models corresponding to the plurality of data feed services selected at block 406. Each domain-specific machine learning model may be trained to translate between a respective data feed service action space and a data feed-agnostic semantic embedding space (e.g., 338 in FIG. 3) that includes the data feed-agnostic aggregator embedding.

Based on the processing of block 408, at block 410, the system may select and perform one or more actions from each of the data feed service action spaces to aggregate, from the plurality of data feed services, data that is responsive to the query. For example, the processing of block 408 may generate, for each applicable action space, a probability distribution over actions in that space. Those actions having the highest probabilities may be performed first, and then actions having lower probabilities (but still exceeding some minimal threshold) may be performed next, etc. In some cases, the same domain model may be iteratively applied to a sequence of states. This sequence of states may represent, for instance, an evolving state of a client application that communicates with a data feed service, an evolving state of an interaction or exchange with the data feed service, a changing context of the user or the client device they operate, etc. The iteratively applied domain model may in some implementations be trained using reinforcement learning, although this is not required.

At block 412, the system, e.g., by way of interface module 106, may cause the aggregated responsive data to be presented as output, audibly, on a screen, etc.

Figure 5:
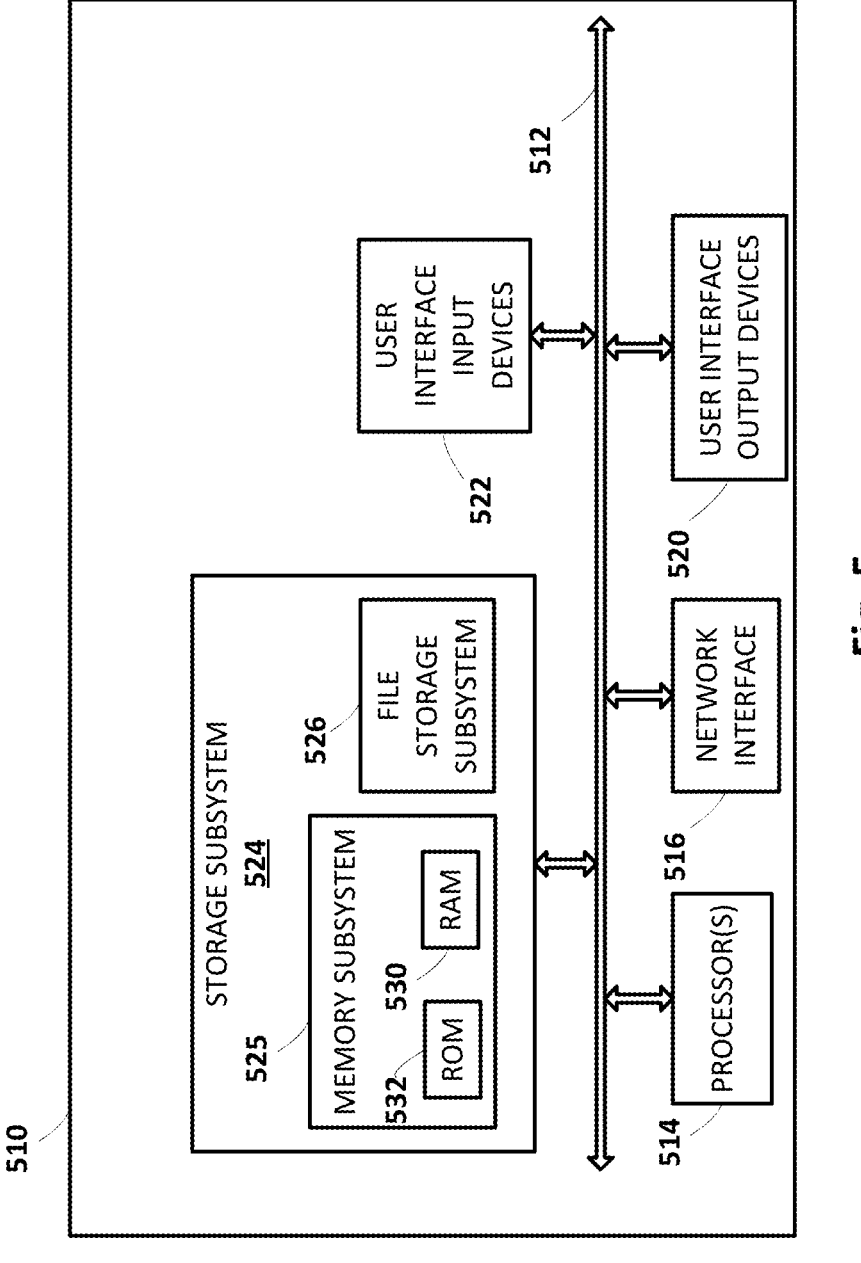
FIG. 5 illustrates an example architecture of a computing device.

FIG. 5 is a block diagram of an example computing device 510 that may optionally be utilized to perform one or more aspects of techniques described herein. In some implementations, one or more of the client computing devices 120-1 to 120-P, inter-domain knowledge system 102, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method 400 of FIG. 4.

These software modules are generally executed by processor 514 alone or in combination with other processors.

Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

obtaining, by one or more of the processors, a natural language input comprising a query for information;

performing, by one or more of the processors, natural language processing (NLP) on the natural language input to generate a data source-agnostic aggregator embedding;

selecting, by one or more of the processors, a plurality of data sources, wherein each data source of the selected plurality of data sources includes its own data source action space, wherein each data source action space comprises actions that are performable to access data communicated via the respective data source;

processing, by one or more of the processors, the data source-agnostic aggregator embedding based on one or more domain models, wherein one or more of the domain models is trained to translate between one or more respective data source action spaces and a data source-agnostic semantic embedding space that includes the data source-agnostic aggregator embedding;

based on the processing, selecting and causing to be performed, by one or more of the processors, one or more actions from each of the data source action spaces to aggregate, from the plurality of data sources, data that is responsive to the query, wherein for at least a given data source of the plurality of data sources, the causing to be performed includes:

interacting with one or more graphical inputs presented as part of an interactive webpage of an interactive website that facilitates access to the given data source to automatically perform one or more actions selected from the data source action space of the given data source; or interacting with an application programming interface (API) that facilitates access to the given data source to automatically perform one or more actions selected from the data source action space of the given data source; and causing, by one or more of the processors, the aggregated responsive data to be rendered at one or more output devices.

2. The method of claim 1, wherein the causing to be performed includes causing a web browser executing on at least one client device configured to communicate using the given data source to automatically interact with one or more of the graphical inputs associated with the interactive webpage.

3. The method of claim 1, wherein the query for information comprises a request for social media posts from a particular individual, and the selected plurality of data sources include two or more social media services that are selected based on membership of the particular individual with the two or more social media services.

4. The method of claim 3, wherein for a given social media service of the two or more social media services, the one or more actions selected from the data source action space of the given social media service include accessing one or more posts by the particular individual from the particular individual's posting history.

5. The method of claim 1, wherein the plurality of data sources are selected based on a lookup table controlled by a user who issued the natural language input.

6. The method of claim 5, wherein the lookup table comprises a contact list of the user.

7. The method of claim 1, wherein the plurality of data sources are selected based on a user who issued the natural language input having previously provided permission to an aggregator agent to access the plurality of data sources.

8. The method of claim 1, wherein the plurality of data sources are selected based on a browsing history of a user who issued the natural language input.

9. A method implemented using one or more processors and comprising:

obtaining, by one or more of the processors, a natural language input comprising a query for information;

performing, by one or more of the processors, natural language processing (NLP) on the natural language input to generate a data source-agnostic aggregator embedding;

selecting, by one or more of the processors, a plurality of data sources, wherein each data source of the selected plurality of data sources includes its own data source action space, wherein each data source action space comprises actions that are performable to access data communicated via the respective data source;

processing, by one or more of the processors, the data source-agnostic aggregator embedding based on one or more domain models to generate probability distributions over respective data source action spaces of the plurality of data sources, wherein one or more of the domain models is trained to translate between one or more respective data source action spaces and a data source-agnostic semantic embedding space that includes the data source-agnostic aggregator embedding;

based on the probability distributions, selecting and causing to be performed, by one or more of the processors, one or more actions from each of the data source action spaces to aggregate, from the plurality of data sources, data that is responsive to the query, wherein for at least a given data source of the plurality of data sources that provides an interactive graphical user interface (GUI), the causing to be performed includes interacting with one or more graphical inputs presented as part of the GUI to automatically perform one or more actions selected from the data source action space of the given data source; and causing, by one or more of the processors, the aggregated responsive data to be rendered at one or more output devices.

10. The method of claim 9, wherein the plurality of data sources are selected based on an entity identifier contained in the query for information.

11. The method of claim 9, wherein the query for information comprises a request for social media posts from a particular individual, and the selected plurality of data sources include two or more social media services that are selected based on membership of the particular individual with the two or more social media services.

12. The method of claim 11, wherein for a given social media service of the two or more social media services, the one or more actions selected from the data source action space of the given social media service include accessing one or more posts by the particular individual from the particular individual's posting history.

13. The method of claim 9, wherein the plurality of data sources are selected based on a lookup table controlled by a user who issued the natural language input.

14. The method of claim 13, wherein the lookup table comprises a contact list of the user.

15. The method of claim 9, wherein the plurality of data sources are selected based on a user who issued the natural language input having previously provided permission to an aggregator agent to access the plurality of data sources.

16. The method of claim 9, wherein the plurality of data sources are selected based on a browsing history of a user who issued the natural language input.

17. A system comprising one or more processors and memory storing instructions that, in response to execution by the one or more processors, cause the one or more processors to:

obtain, by one or more of the processors, a natural language input comprising a query for information;

perform, by one or more of the processors, natural language processing (NLP) on the natural language input to generate a data source-agnostic aggregator embedding;

select, by one or more of the processors, a plurality of data sources, wherein each data source of the selected plurality of data sources includes its own data source action space, wherein each data source action space comprises actions that are performable to access data communicated via the respective data source;

process, by one or more of the processors, the data source-agnostic aggregator embedding based on one or more domain models, wherein one or more of the domain models is trained to translate between one or more respective data source action spaces and a data source-agnostic semantic embedding space that includes the data source-agnostic aggregator embedding;

based on the processing, select and cause, by one or more of the processors, one or more actions from each of the data source action spaces to be performed to aggregate, from the plurality of data sources, data that is responsive to the query, wherein for at least a given data source of the plurality of data sources, the performance of the one or more actions includes:

interacting with one or more graphical inputs presented as part of an interactive webpage of an interactive website that facilitates access to the given data source to automatically perform one or more actions selected from the data source action space of the given data source; or interacting with an application programming interface (API) that facilitates access to the given data source to automatically perform one or more actions selected from the data source action space of the given data source; and cause, by one or more of the processors, the aggregated responsive data to be rendered at one or more output devices.

18. The system of claim 17, wherein the plurality of data sources are selected based on an entity identifier contained in the query for information.

19. The system of claim 17, wherein the query for information comprises a request for social media posts from a particular individual, and the selected plurality of data sources include two or more social media services that are selected based on membership of the particular individual with the two or more social media services.

20. The system of claim 19, wherein for a given social media service of the two or more social media services, the one or more actions selected from the data source action space of the given social media service include accessing one or more posts by the particular individual from the particular individual's posting history.

* * * * *